(12) United States Patent
Mogi et al.

(10) Patent No.: US 6,476,108 B1
(45) Date of Patent: Nov. 5, 2002

(54) AQUEOUS COATING COMPOSITION

(75) Inventors: Takeshi Mogi, Tokyo (JP); Minoru Katou, Tokyo (JP); Katsuhiko Tsuruoka, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/557,009

(22) Filed: Apr. 20, 2000

(30) Foreign Application Priority Data

Apr. 22, 1999 (JP) ............................................. 11-115507
Mar. 10, 2000 (JP) ........................................ 2000-066568

(51) Int. Cl.$^7$ ............................ C08J 3/26; C08L 33/12
(52) U.S. Cl. ....................................... 524/247; 524/236
(58) Field of Search ................................... 524/236, 247

(56) References Cited

U.S. PATENT DOCUMENTS

| | | |
|---|---|---|
| 4,649,170 A | 3/1987 | Reid |
| 5,840,384 A | 11/1998 | Noda et al. |

FOREIGN PATENT DOCUMENTS

| | | |
|---|---|---|
| GB | 2 033 400 | 5/1980 |

OTHER PUBLICATIONS

Derwent Publications, AN 1984–143597, JP 59 075959, Apr. 28, 1984.
Derwent Publications. AN 1991–234989, JP 03 153782, Jul. 1, 1991.
Patent Abstracts of Japan, vol. 009, No. 130 (C–284), Jun. 5, 1985, JP 60 018560, Jan. 30, 1985.
Patent Abstracts of Japan, vol. 009, No. 222 (C–302), Sep. 9, 1985, JP 60 086176, May 15, 1985.
Patent Abstracts of Japan, vol. 012, No. 398 (C–538), Oct. 21, 1988, JP 63 139906, Jun. 11, 1988.
Patent Abstracts of Japan, vol. 018, No. 361 (C–1222), Jul. 7, 1994, JP 06 093232, Apr. 5, 1994.

*Primary Examiner*—James J. Seidleck
*Assistant Examiner*—U K Rajguru
(74) *Attorney, Agent, or Firm*—Oblon, Spivak, McClelland, Maier & Neustadt, P.C.

(57) ABSTRACT

An aqueous coating composition comprising (A) an aqueous dispersing material which is a copolymer having a glass transition temperature (Tg) of 80° C. or less which is obtained by the copolymerization a specific unsaturated carboxylic acid, (meth)acrylic acid alkyl ester, and other monomers and (B) a specific aminoalcohol compound in a specific proportion. The aqueous coating composition is safe due to absence of heavy metals, produces excellent gloss and has a fine external appearance when coated, and exhibits superior durability and water resistance which are represented by black heel mark resistance and anti-scuff properties. The composition is particularly useful as a floor coating material.

20 Claims, No Drawings

AQUEOUS COATING COMPOSITION

BACKGROUND OF THE INVENTION

1. Field of the Invention

The present invention relates to an aqueous coating composition. More particularly, the present invention relates to an aqueous coating composition which can be suitably used for coating surfaces of wood, plastics, ceramics, metals, and the like, is safe due to absence of heavy metals, produces excellent gloss and fine external appearance when applied, and exhibits superior durability and water resistance which are represented by properties resistant black heel marks and anti-scuff properties. The aqueous coating composition is particularly useful as a floor coating material.

2. Description of Background Art

Responding to recent regulations which impose certain limitations on the content of volatile organic compounds in floor coating compositions, various aqueous coating compositions have been proposed. For example, Publication of Translation of International Patent Application (Toku-Hyo Hei No. 8-501577 (WO 94/07938) discloses an aqueous coating composition prepared from a dicarboxylic acid, a monocarboxylic acid which contains a metal sulfonate group (containing Cu, Fe, or the like as a heavy metal), glycol, an amino alcohol, and a poly-functional compound which contains 3 or more hydroxyl groups. Because these aqueous coating compositions which contain heavy metals exhibit excellent durability, they are widely used for coating floor materials and the like.

However, in response to an increased concern about environmental problems in recent years under which complete assurance for pollution-free and safe materials is required, aqueous compositions containing no heavy metals are desired as coating compositions for floor materials which inherently should not cause water pollution problems and the like if handled in a well-controlled manner.

Japanese Patent No. 2973060 discloses an aqueous coating composition which is free from heavy metals, but contains an aqueous dispersing material possessing a free carboxyl group which is obtained by emulsion polymerization of an ethylenically unsaturated monomer, an amino alcohol, and an acetic acid ester.

However, these aqueous coating compositions which do not contain heavy metals are intended mainly for coating floors in homes, and are not necessarily satisfactory for coating floors requiring superior durability such as floors in department stores. Specifically, floors of department stores, for example, are not only subjected to severe contact with the shoes of a great number of customers, especially high-heeled shoes for women, but are also required to exhibit a beautiful appearance.

The present invention has been achieved in view of these problems and has an objective of providing an aqueous coating composition which is safe due to absence of heavy metals, produces excellent gloss and has a fine external appearance when coated, exhibits superior durability and water resistance which are represented by properties resistant to black heel marks (hereinafter called "black heel mark resistance") and anti-scuff properties, and is particularly useful as a floor coating material.

As a result of extensive studies, the present inventors have found that the above object can be achieved by an aqueous coating composition comprising (A) an aqueous dispersing material which is a copolymer having a glass transition temperature (Tg) of 80° C. or less which is obtained by the copolymerization a specific unsaturated carboxylic acid, (meth)acrylic acid alkyl ester, and other monomers and (B) a specific aminoalcohol compound in a specific proportion. This finding has led to the completion of the present invention.

SUMMARY OF THE INVENTION

Specifically, the present invention provides the following aqueous coating compositions.

An aqueous coating composition comprising (A) 100 parts by weight (solid basis) of an aqueous dispersing material which is a copolymer having a glass transition temperature (Tg) of 80° C. or less which is obtained by the copolymerization of (a) 2–40 wt % of α,β-unsaturated carboxylic acid (monomer (a)), (b) 20–90 wt % of (meth) acrylic acid alkyl ester (monomer (b)), and (c) 0–78 wt % of monomers (monomer (c)) polymerizable with the monomer (a) and monomer (b), and (B) 0.1–100 parts by weight of a compound shown by the following formula (1),

$$R_{3-n}NX_n \qquad (1)$$

wherein R represents a hydrogen atom, an alkyl group having 1–12 carbon atoms, or an aminoalkyl group having 1–12 carbon atoms, X represents a hydroxyalkyl group having 1–10 carbon atoms, and n is an integer from 1–3, provided that two or more Rs, if present, may be either different or identical and two or more Xs, if present, may be either different or identical.

The aqueous coating composition described in (1) above, further comprising (C) an alkali metal compound in an amount of 0.05–40 parts by weight for 100 parts by weight (solid basis) of the component (A).

Other objects, features and advantages of the invention will hereinafter become more readily apparent from the following description.

DETAILED DESCRIPTION OF THE INVENTION AND PREFERRED EMBODIMENTS

The present invention will now described in more detail by way of embodiments.

The aqueous coating composition of the composition is characterized by comprising (A) an aqueous dispersing material which is a specific copolymer (hereinafter "component (A)") having a glass transition temperature (Tg) of 80° C. or less and (B) the compound shown by the above formula (1) (hereinafter "component (B)").

Each component for the aqueous coating composition will now be described in more detail.

1. Component (A)

The component (A) used in the present invention is a copolymer obtained by the copolymerization of (a) 2–40 wt % of α,β-unsaturated carboxylic acid (hereinafter "monomer (a)"), (b) 20–90 wt % of (meth)acrylic acid alkyl ester (hereinafter "monomer (b)"), and (c) 0–78 wt % of monomers polymerizable with the monomer (a) and monomer (b), and (B) (hereinafter "monomer (c)").

(1) Monomer (a)

As examples of the monomer (a) used in the present invention, (meth)acrylic acid, fumaric acid, itaconic acid, monoalkyl itaconate, maleic acid, crotonic acid, 2-methacryloyloxyethlhexahydrophtalic acid, and the like can be given. Of these, (meth)acrylic acid is preferred in view of polymerization stability and durability.

These monomer (a) compounds can be used either individually or in combination of two or more.

The amount of the monomer (a) among all monomers is in the range of 2–40 wt %, preferably 5–35 wt %, and more preferably 10–30 wt %. If this amount is less than 2 wt %, the product exhibits only poor durability; if more than 40 wt %, leveling characteristics of the product are impaired.

(2) Monomer (b)

Given as examples of the monomer (b) used in the present invention are methyl(meth)acrylate, ethyl(meth)acrylate, n-propyl(meth)acrylate, i-propyl(meth)acrylate, n-butyl (meth)acrylate, i-butyl(meth)acrylate, n-amyl(meth) acrylate, i-amyl(meth)acrylate, hexyl(meth)acrylate, ethylhexyl(meth)acrylate, i-nonyl(meth)acrylate, decyl (meth)acrylate, hydroxymethyl(meth)acrylate, hydroxyethyl (meth)acrylate, hydroxypropyl(meth)acrylate, hydroxybutyl (meth)acrylate, hydroxyamyl(meth)acrylate, hydroxyhexyl (meth)acrylate, cyclohexyl(meth)acrylate, and the like. Of these, butyl(meth)acrylate and methyl(meth)acrylate are preferred in view of durability and weather resistance.

These monomer (b) compounds can be used either individually or in combination of two or more.

The amount of monomer (b) among all the monomers is in the range of 30–90 wt %, preferably 40–80 wt %, and more preferably 50–70 wt %. If less than 30 wt %, the product has poor water resistance and weather resistance; if more than 90 wt %, glossiness is poor.

(3) Monomer (c)

The following compounds can be given as the monomer (c) compounds used in the present invention:

benzyl(meth)acrylate, phenoxyethyl(meth)acrylate, alkylphenoxyethyl(meth)acrylate, phenoxydiethylene glycol(meth)acrylate, phenoxypolyethylene glycol(meth) acrylate, alkylphenol ethylene oxide(meth)acrylate, alkylphenol propylene oxide(meth)acrylate, 2-hydroxy-3-phenoxypropyl(meth)acrylate, ethylene glycol(meth) acrylate monophthalate, and ethylene glycol(meth) acrylate hydroxyethyl phthalate;

polyester(meth)acrylates;

epoxy compounds such as allyl glycidyl ether, glycidyl (meth)acrylate, and methyl glycidyl(meth)acrylate; polyfunctional monomers such as divinylbenzene, ethylene glycol di(meth)acrylate, diethylene glycol di(meth) acrylate, triethylene glycol di(meth)acrylate, tetraethylene glycol di(meth)acrylate, propylene glycol di(meth) acrylate, dipropylene glycol di(meth)acrylate, tripropylene glycol di(meth)acrylate, tetrapropylene glycol di(meth)acrylate, butanediol di(meth)acrylate, hexanediol di(meth)acrylate, trimethylolpropane tri(meth) acrylate, and pentaerythritol tetra(meth)acrylate;

amide compounds such as (meth)acrylamide, N-methylol (meth)acrylamide, N-methoxymethyl(meth)acrylamide, N-butoxymethyl(meth)acrylamide, N,N'-methylenebisacrylamide, diacetone acrylamide, maleic acid amide, and maleimide; vinyl compounds such as vinyl chloride, vinylidene chloride, vinyl acetate, and fatty acid vinyl esters;

Fluorine-containing monomers such as trifluoroethyl(meth) acrylate and pentadecafluorooctyl(meth)acrylate; reactive silicone compounds such as γ-methacryloylpropanetrimethoxysilane and α-(3-methacryloxypropyl)polydimethylsiloxane;

aromatic vinyl compounds such as styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinylnaphthalene, and divinylbenzene;

aminoalkyl esters of ethylene-based unsaturated carboxylic acid such as monoamines, aminoethyl acrylate, dimethylaminoethyl acrylate, and butylaminoethyl acrylate; aminoalkyl amides of ethylene-based unsaturated carboxylic acid such as aminoethyl acrylamide, dimethylaminomethyl methacrylamide, and methylaminopropyl methacrylamide; and cyanated vinyl monomers such as (meth) acrylonitrile and α-chloroacrylonitrile;

aldo group-containing monomers such as acrolein, formyl styrene, formyl-α-styrene, and (meth)acrylamide pivalinealdehyde;

keto group-containing monomers such as diacetone(meth) acrylamide, vinyl methyl ketone, vinyl ethyl ketone, vinyl n-propyl ketone, vinyl i-propyl ketone, vinyl n-butyl ketone, vinyl i-butyl ketone, vinyl sec-butyl ketone, and vinyl t-butyl ketone; and acetoacetyl group-containing unsaturated monomers such as acetoacetoxy(meth)acrylate and allyl acetoacetate.

Of these, aromatic vinyl monomers such as styrene and the like are preferred in view of superior gloss of the products.

These monomer (c) compounds can be used either individually or in combination of two or more.

Although the monomer (c) is not an essential component in the present invention, the content among all the monomers is in the range of 0–78 wt %, preferably 0.5–60 wt %, and more preferably 1–50 wt %. If more than 78 wt %, the resulting products exhibit poor durability.

(4) Method for Preparing the Component (A)

There is no specific restriction to the method for preparing the aqueous dispersing material which is the component (A) of the present invention. For example, the aqueous dispersing material can be obtained as an emulsion of the copolymer by a conventional emulsion polymerization method. More specifically, a mixture prepared by adding the above monomers, an emulsifying agent, an initiator, a reducing agent, a chain transfer agent, a chelating agent, a pH modifier, and the like to an aqueous medium is subjected to a polymerization reaction at 30–100° C. for 1–30 hours to obtain an aqueous dispersing material.

Emulsifying agents which can be used in the above method include, but are not limited to, anionic emulsifying agents, nonionic emulsifying agents, combined anionic-nonionic emulsifying agents, amphoteric surfactants, cationic surfactants, reactive emulsifying agents which are copolymerizable with the above-described monomers, water soluble polymers, and the like.

As examples of anionic emulsifying agents, higher alcohol sodium sulfate, alkylbenzene sodium sulfonate, succinic acid dialkyl ester sodium sulfonate, alkyl diphenyl ether sodium disulfonate, sulphate of polyoxyethylene alkyl (or alkylphenyl) ether, and the like can be given. Of these, sodium lauryl sulfate, sodium dodecylbenzenesulfonate, sulphate of polyoxyethylene alkyl ether are preferred.

As examples of nonionic emulsifying agents, polyoxyethylene alkyl ether, polyoxyethylene alkylallyl ether, polyoxyethylene nonylphenyl ether, polyoxyethylene octylphenyl ether, and the like can be given. Of these, polyoxyethylene alkyl ether is preferred.

As examples of amphoteric emulsifying agents, lauryl betaine and the like can be given.

As examples of cationic emulsifying agents, alkyl pyridinyl chloride, alkylammonium chloride, and the like can be given.

As examples of reactive emulsifying agents copolymerizable with the monomers, sodium styrene sulfonate, sodium allylalkyl sulfonate, alkyl allyl sulfosuccinate, polyoxyethylene alkylallyl glycerol ether sulfate, polyoxyethylene alkylphenol allyl glycerol ether sulfate, and the like can be given. Of these, sodium styrene sulfonatet, sodium allylalkyl sulfonate, alkyl allyl sulfosuccinate are preferred.

As water soluble polymers used as an emulsifying agent, polyvinyl alcohol, polyacrylate, water soluble (meth)acrylate copolymer, salt of styrene-maleic acid copolymer, poly(meth)acrylamide, copolymer of poly(meth)acrylamide, and the like can be given. Of these, partially saponified polyvinyl alcohol, water soluble (meth)acrylate copolymer, salts of carboxylated aromatic vinyl copolymer such as a salt of styrene-maleic acid copolymer, styrene-(meth)acrylic acid copolymer, and the like are preferred.

Of these emulsifying agents, soap-free type reactive emulsifying agents are preferred due to high hot water resistance.

The amount of emulsifying agent used is preferably 0–5 parts by weight for 100 parts by weight of the total amount of monomers.

If more than 5 parts by weight, the resulting product may have inferior water resistance.

As examples of polymerization initiators, water soluble initiators and the oil soluble initiators can be given.

Persulfates, hydrogen peroxides, and the like can be given as water soluble initiators. As required, these initiators can be used in combination with a reducing agent.

As examples of reducing agents, sodium pyro-bisulfite, sodium sulfite, sodium thiosulfate, L-ascorbic acid and a salt thereof, sodium formaldehyde sulfoxylate, and the like can be given.

As examples of oil soluble initiators, 2,2'-azobisisobutyronitrile, 2,2'-azobis(4-methoxy-2,4-dimethylvaleronitrile), 2,2'-azobis-2,4-dimethylvaleronitrile, 1,1'-azobis-cyclohexane-1-nitrile, benzoyl peroxide, dibutyl peroxide, cumenehydroperoxide, and the like can be given. Of these, cumenehydroperoxide, isopropylbenzene hydroperoxide, p-methane hydroperoxide, azobisisobutyronitrile, benzoyl peroxide, t-butylhydroperoxide, 3,5,5-trimethylhexanol peroxide, t-butylperoxy(2-ethylhexanoate), and the like are preferred.

These polymerization initiators can be used dissolved either in monomers or a solvent.

The amount of polymerization initiator used is preferably from 0.1–3 parts by weight for 100 parts by weight of the total amount of monomers.

Given as examples of chain transfer agents are halogenated hydrocarbons (for example, carbon tetrachloride, chloroform, bromoform), mercaptans (for example, n-dodecylmercaptan, t-dodecylmercaptan, n-octylmercaptan), xanthogens (for example, dimethylxanthogen disulfide, diisopropylxanthogen disulfide), terpenes (for example, dipentene, terpinolene), 1,1-diphenylethylene, α-methylstyrene dimers (at least one of 2,4-diphenyl-4-methyl-1-pentene (I), 2,4-diphenyl-4-methyl-pentene (II), and 1,1,3-trimethyl-3-phenylindan (III), and preferably a mixture of (I), (II), and (III) at a weight ratio (I)/((II)+(III))= (40–100)/(0–60)), unsaturated cyclic hydrocarbon compounds (for example, 9,10-dihydroanthracene, 1,4-dihydronaphthalene, indene, 1,4-cyclohexadiene), unsaturated heterocyclic compounds (for example, xanthene, 2,5-dihydrofuran), and the like.

The amount of chain transfer agent used is preferably from 0–5 parts by weight for 100 parts by weight of the total amount of monomers.

A solvent such as methyl ethyl ketone, acetone, trichlorotrifluoroethane, methyl isobutyl ketone, dimethylsulfoxide, toluene, dibutylphthalate, methylpyrrolidone, ethyl acetate, alcohols, cellosolves, carbinols, and the like can be used in the emulsion polymerization, as required.

To ensure excellent processability, protection against disasters, environmental safety, and manufacturing safety, the amount of these solvents used in the composition is preferably from 0–10 part by weight for 100 parts by weight of total amount of monomers.

The emulsion polymerization can be carried out by, for example, polymerizing all the monomers in one reaction, polymerizing part of the monomers first and then continuously or intermittently adding the remaining part of the monomers to polymerize, polymerizing the monomers while continuously adding monomers during polymerization. When seed polymerization is adopted, seed particles are prepared first by copolymerizing the monomers by emulsion polymerization, then adding the copolymers (a) to (c) to the seeds to perform emulsion polymerization.

The final polymerization conversion rate of the copolymer used in the present invention is from 90 to 100 wt %, and preferably from 95 to 100 wt %.

The weight average molecular weight of the copolymer used in the present invention is from 3,000 to 1,000,000, preferably from 10,000 to 800,000, and more preferably 30,000 to 500,000. If less than 3,000, durability of the products is inferior; if more than 1,000,000, leveling characteristics may be poor.

The glass transition temperature of the copolymer used in the present invention is preferably from 10–180° C., and more preferably from 20–175° C. If less than 10° C., durability of the products is inferior; if more than 180° C., film-forming capability may be poor.

The average particle diameter of the copolymer used in the present invention is preferably from 0.01 to 1 $\mu$m, and more preferably from 0.02 to 0.5 $\mu$m, and particularly preferably from 0.05 to 0.2 $\mu$m. If more than 1 $\mu$m, glossiness of the product may be inferior; if less than 0.01 $\mu$m, leveling characteristics may be poor.

2. Component (B)

The component (B) which is used in the present invention is a compound shown by the above-described formula (1).

In the formula (1), the alkyl group represented by R has a carbon atom number from 1–12, and preferably from 1–4, and is, for example, a methyl, ethyl, n-propyl, iso-propyl, n-butyl, iso-butyl, sec-butyl, t-butyl, n-hexyl group, or the like.

The aminoalkyl group represented by R has a carbon atom number from 1–12, and preferably from 1–4, and is, for example, an amino methyl, amino ethyl group, or the like. Two or more Rs, if present, may be either identical or different.

The hydroxy alkyl group represented by X has a carbon atom number from 1–10, and preferably from 1–4, and is, for example, α-hydroxyethyl, β-hydroxyethyl, γ-hydroxypropyl, and the like. Two or more Xs, if present, may be either identical or different.

As examples of the component (B) used in the present invention, α-aminoalcohol, β-aminoalcohol, diethanolamine, triethanolamine, 2-amino iso-hexyl alcohol, N,N-diethylethanolamine, N,N-dimethylethanolamine, aminoethylethanolamine, N-methyl-N,N-diethanolamine, N,N-dibutylethanolamine, N-methylethanolamine, 3-amino-1-propanol, and the like can be given. Of these, β-aminoalcohol, diethanolamine, and triethanolamine are preferred in view of superior leveling characteristics and durability of the products.

These compounds may be used either individually or in combinations of two or more as the component (B).

The amount of the component (B), in terms of the amount of solid components, is in the range of 0.1–100 parts by weight, preferably 0.2–80 parts by weight, and more preferably 0.5–60 parts by weight, for 100 parts by weight of the component (A). If the amount of the component (B) is less than 0.1 part by weight, durability of the products is inferior; if more than 100 parts by weight, water resistance of the products is inferior.

3. Alkali Metal Compound (C)

In addition to the components (A) and (B), the aqueous coating composition of the present invention may comprise an alkali metal compound (C) (hereinafter "component (C)") in the amount from 0.05–40 parts by weight for 100 parts by weight (solid basis) of the component (A).

A hydroxide of alkali metal such as sodium hydroxide and potassium hydroxide, a carbonate of alkali metal such as sodium carbonate and potassium carbonate, a hydrogencarbonate of alkali metal such as sodium hydrogencarbonate, and the like can be given as examples of the component (C) used in the present invention. Among these, sodium hydroxide, potassium hydroxide, and the like are preferable.

4. Other Components

In addition to the above components (A) and (B), and the component (C) which is used as required, various components such as (D) a wax emulsion, (E) an alkali-soluble resin, (F) a film-forming adjuvant,(G) various other additives such as a wetting agent, dispersant, leveling agent, antiseptic agent, anti-foaming agent, and the like may be added to the aqueous coating composition of the present invention.

As the wax emulsion (D), a polyethylene-based emulsion and the like can be given. The amount of the component (D) on a solids basis is in the range of 0–40 parts by weight, preferably 5–30 parts by weight, and more preferably 10–30 parts by weight, for 100 parts by weight of the copolymer (A). If more than 40 parts by weight, the product has poor glossiness and inferior appearance.

As examples of an alkali-soluble resin (E), styrene-maleic acid copolymer resin, shellac, rosin-modified maleic resin, and the like can be given. These resins can improve the leveling characteristics and delamination characteristics of the aqueous coating composition. The amount of these resins on a solids basis is in the range of 0–50 parts by weight, preferably 5–40 parts by weight, and more preferably 10–30 parts by weight, for 100 parts by weight of the copolymer (A). If more than 50 parts by weight, the resulting product may have inferior durability.

Component (F) may be a film-forming adjuvant such as, for example, tributoxy phosphate, a polyhydric alcohol such as diethylene glycol, isophorone, benzyl alcohol, monoethyl monomethyl ether such as 3-methoxy butanol-1, benzylbutyl phthalate, dibutyl phthalate, dimethyl phthalate, triphenyl phosphate, and carbitol; or additives commonly used for coatings such as a pigment. The amount of the component (F) on a solids basis is in the range from 0–50 parts by weight, preferably 5–40 parts by weight, and more preferably 10–30 parts by weight, for 100 parts by weight of the copolymer (A). If more than 50 parts by weight, the resulting product may have inferior durability.

(G) Other Additives Such as a Wetting Agent, Dispersant, Leveling Agent, Antiseptic Agent, and Anti-foaming Agent As examples of a wetting agent, potassium salt of the perfluoroalkyl carboxylic acid and the like can be given.

As examples of a dispersant, anionic surfactants, nonionic surfactanst, and the like can be given.

As examples of a leveling agent, rosin acid ester and the like can be given.

As examples of an antiseptic agent, a mixture of 2-methyl-4-iso-azophosphorus-3-one, 5-chloro-2-methyl-4-iso-azophosphorus-3-one, and the like can be given.

5. Glass Transition Temperature (Tg) of Copolymer

The aqueous coating composition of the present invention is characterized by a glass transition temperature (Tg) of 80° C. of the copolymer.

If the glass transition temperature (Tg) of the copolymer is above 80° C., durability becomes insufficient because the film-forming capability of the composition decreases. If less than 10° C., durability may be inferior.

Glass transition temperature (Tg) for the compositions A, B, C, . . . in the present invention means a glass transition temperature (Tg) calculated by a FOX formula which is shown by the following formula (1):

$$1/Tg\ (K) = \text{(weight fraction of } A/TgA\ (K)) + \text{(weight fraction of } B/TgB\ (K)) + \text{(weight fraction of } C/TgC\ (K)) + \quad (1)$$

The aqueous coating composition of the present invention is applied to a substrate by spraying, fabric coating, or brushing, immediately followed by drying in air or by heating, thereby producing a strong coating film.

EXAMPLES

The present invention will now be described in more detail by way of examples, which should not be construed as limiting the present invention.

(1) Preparation of Component (A)

A glass reaction vessel (3 l) equipped with a stirrer, a condenser, a thermometer, and a dripping funnel was charged with 100 parts by weight of deionized water, 1 part by weight of sodium lauryl sulfate, and 0.5 part by weight of ammonium persulfate. After replacing internal air with nitrogen gas, the mixture was gradually heated to an internal temperature of 65° C., thereby dissolving the components. An emulsion previously prepared from 50 parts by weight of deionized water, 1 part by weight of sodium lauryl sulfate, and monomers shown in Table 1 in a separate container was added dropwise to the mixture over three hours. During dropwise addition of the emulsion, the reaction was carried out at 80° C. while introducing nitrogen gas. After the addition, the mixture was stirred for two hours at 80° C., and cooled to 25° C. to terminate the reaction.

The polymerization conversion rates of all component (A) copolymers (i) to (vii) thus obtained were over 98 wt %. In addition, almost no coagulates were produced.

The weight average molecular weight of the copolymers in the component (A) thus produced was measured by the GPC method. The polystyrene-reduced weight average molecular weight is shown in Table 1.

(2) Preparation of Aqueous Coating Compositions

Examples 1–3 and Comparative Examples 1–5

Aqueous coating compositions were prepared by adding the component (B) compounds in amounts (on a solids basis) shown in Table 1 which were held at 25° C. to 100 parts by weight of the component (A) copolymers (i) to (vii) prepared as mentioned above.

(3) Preparation of Aqueous Floor Coating Composition for Grossing

Aqueous floor coating compositions of the following formulations were prepared.

Formulations for Aqueous Floor Coating Compositions

| | |
|---|---|
| Aqueous coating composition *1 | 80 parts by weight |
| Wax emulsion *2 | 15 parts by weight |
| Alkali-soluble resin *3 | 5 parts by weight |
| Fluorine-containing surfactant *4 | 0.5 part by weight |

*1 A film-forming adjuvant prepared by mixing tributoxyethylphosphate and carbitol at a weight ratio of 1:4 was added to aqueous coating compositions obtained in Examples 1–3 and Comparative Examples 1–5, the minimum film-forming temperature was adjusted to 5° C., and the solid component percentage was adjusted to 14 wt % by the addition of deionized water.
*2 Wax emulsion: HYTEC E-4B manufactured by Toho Chemical Co., Ltd. The solid component percentage was adjusted to 15 wt %.
*3 Alkali-soluble resin: "SMB6 25A" (styrene-maleic acid resin with an acid number of 220 and molecular weight of 1,900) manufactured by ARCO Chemical Company. The solid component percentage was adjusted to 15 wt %.
*4 Fluorine-containing surfactant: $C_6F_{17}SO_2N(C_2H_5)CH_2COOK$, The solid component percentage was adjusted to 1 wt %.

The aqueous coating compositions were evaluated according to the following methods.

(1) Black Heel Mark Resistance

The aqueous coating compositions were applied to homogeneous tiles in an amount of 10 g per one square meter, and dried.

Application was repeated three times to obtain samples. The samples were placed on a busy street people passing 50–100 times back and forth per day to observe the degree of black heel mark (BHM) attachment. The results of evaluation were classified as follows.
○: There are almost no black heel marks.
Δ: There are some heel marks.
X: There are many black heel marks.

(2) Anti-scuff Properties

Samples were prepared and placed on a street in the same manner as in the BHM evaluation test to observe the degree of scuffing produced. The results of evaluation were classified as follows.

○: There was almost no scuffing produced.
Δ: There was some scuffing produced.
X: There was much scuffing produced.

(3) Gloss

Samples were prepared in the same manner as in the BHM evaluation test and reflection at an angle of 60° was measured using a Murakami glossimeter.

(4) Leveling

The aqueous coating compositions were applied to homogeneous tiles in an amount of 10 g per one square meter, immediately followed by drawing of diagonals in an X mark, and the coatings were dried. The drying was repeated three times to obtain samples. The degree of disappearance of the lines after drying was observed. The results of evaluation were classified as follows.
○: The lines have almost disappeared.
Δ: The lines could be seen only with difficulty.
X: The lines were almost intact.

(5) Water Resistance

Samples were prepared in the same manner as in the BHM evaluation test. 0.1 ml of water was dropped onto the center of a sample. The sample was covered by glass and allowed to stand for 60 minutes, following which water was absorbed and the sample was allowed to stand for one hour, to observe the degree of color change (whiteness). The results of evaluation were classified as follows.
○: The sample did not become white.
Δ: The sample becameslightly white.
X: The sample became significantly white.

(6) Low Temperature Film-forming Capability

About 5 g of the aqueous coating composition was placed on a petri dish, dried overnight at about 5° C. to observe the state of the film. The results of evaluation were classified as follows.
○: No cracks were observed.
X: Cracks were observed.

The results of evaluation of the floor coating materials using the aqueous coating compositions for glossing floors prepared from the compositions obtained in Examples and Comparative Examples are shown in Table 1.

TABLE 1

| | Example | | | Comparative Example | | | | | |
|---|---|---|---|---|---|---|---|---|---|
| | 1 | 2 | 3 | 1 | 2 | 3 | 4 | 5 | 6 |
| Aqueous coating composition | A | B | C | D | E | F | G | H | I |
| Component (A) (parts by weight) | (i) | (ii) | (iii) | (iv) | (v) | (i) | (i) | (vi) | (vii) |
| Monomer component | | | | | | | | | |
| Acrylic acid | — | — | 3 | — | 5 | — | — | — | — |
| Methacrylic acid | 22 | 24 | 25 | 1 | 55 | 22 | 22 | 13 | 20 |
| n-Butyl acrylate | 20 | 25 | 25 | 20 | 25 | 20 | 20 | 20 | 10 |
| Methyl methacrylate | 38 | 31 | 32 | 39 | 10 | 38 | 38 | 17 | 20 |
| Styrene | 20 | 20 | 15 | 40 | 5 | 20 | 20 | 50 | 50 |
| Weight average molecular weight of the copolymer | $110 \times 10^3$ | $58 \times 10^3$ | $32 \times 10^3$ | $100 \times 10^3$ | $22 \times 10^3$ | $110 \times 10^3$ | $11 \times 10^3$ | $15 \times 10^3$ | $50 \times 10^3$ |
| Component (B) (parts by weight) | | | | | | | | | |
| β-Aminoethanol | 7 | — | — | 0.5 | — | 0.05 | — | — | 7 |
| Diethanolamine | — | 8 | — | — | 20 | — | — | — | — |
| Triethanolamine | — | — | 9 | — | — | — | 110 | — | — |
| Component (C) (parts by weight) | | | | | | | | | |
| $[Zn(NH_3)_4]CO_3$ | — | — | — | — | — | — | — | 6 | — |
| Glass transition temperature (° C.) | 68 | 58 | 59 | 56 | 75 | 68 | 68 | 62 | 89 |

TABLE 1-continued

|  | Example | | | Comparative Example | | | | | |
|---|---|---|---|---|---|---|---|---|---|
|  | 1 | 2 | 3 | 1 | 2 | 3 | 4 | 5 | 6 |
| Evaluation as floor coating material | | | | | | | | | |
| Black heel mark resistance | ○ | ○ | ○ | X | ○ | X | ○ | ○ | X |
| Anti-scuff properties | ○ | ○ | ○ | X | ○ | X | ○ | ○ | X |
| Gloss (%) | 58 | 60 | 56 | 62 | 46 | 60 | 55 | 55 | 47 |
| Leveling | ○ | ○ | ○ | ○ | X | ○ | ○ | ○ | ○ |
| Water resistance | ○ | ○ | ○ | ○ | ○ | ○ | X | ○ | ○ |
| Low temperature film-forming capability | ○ | ○ | ○ | ○ | ○ | ○ | ○ | ○ | X |
| Heavy metal-containing crosslinking agent | None | None | None | None | None | None | None | Used | None |

The evaluation results shown in Table 1 can be summarized as follows.

The aqueous coating compositions of the present invention prepared in Examples 1–3 showed superior film performance in all evaluation items, i.e. black heel mark resistance, anti-scuff properties, gloss (%), leveling, and water resistance.

The composition of Comparative Example 1 which contains α,β-unsaturated carboxylic acid in an amount less than required in the present invention exhibited inferior black heel mark resistance and anti-scuff properties.

The composition of Comparative Example 1 which contains α,β-unsaturated carboxylic acid in an amount less than that required in the present invention exhibited inferior black heel mark resistance and anti-scuff properties.

Comparative Example 3 is an example of a composition which contains the component (B) in an amount less than that required in the present invention. The composition exhibited inferior black heel mark resistance and anti-scuff properties.

Comparative Example 4 is an example of a composition which contains the component (B) in an amount more than that specified in the present invention. The composition exhibited inferior water resistance.

Comparative Example 5 is an example of a composition in which a conventional Zn-based crosslinking agent is used instead of the component (B). The compositions of Examples 1–3 exhibited film-forming capability equivalent to or better than the composition of Comparative Example 5.

Comparative Example 6 is an example of a composition in which the copolymer has a glass transition temperature (Tg) outside the range specified in the present invention. The composition exhibited poor film-forming capability, durability, and gloss.

As described above, the present invention provides an aqueous coating composition which is safe due to absence of heavy metals, produces excellent gloss and has a fine external appearance when coated, and exhibits superior durability and water resistance which are represented by black heel mark resistance and anti-scuff properties. The composition is particularly useful as a floor coating material.

Obviously, numerous modifications and variations of the present invention are possible in light of the above teachings. It is therefore to be understood that, within the scope of the appended claims, the invention may be practiced otherwise than as specifically described herein.

What is claimed is:

1. An aqueous coating composition comprising:
   (A) 100 parts by weight (solid basis) of an aqueous dispersing material comprising a copolymer having a glass transition temperature (Tg) of 80° C. or less which is prepared by the copolymerization of (a) 2–40 wt % of α,β-unsaturated carboxylic acid (monomer (a)), (b) 2–40 wt % of (meth)acrylic acid alkyl ester (monomer (b)), and (C) 0–78 wt % of monomers (monomer (c)) polymerizable with the monomer (A) and monomer (b), and
   (B) 0.1–100 parts by weight of a compound having the following formula (1), $$R_{3-n}NX_n \qquad (1)$$

wherein R represents a hydrogen atom, an alkyl group having 1–12 carbon atoms, or an aminoalkyl group having 1–12 carbon atoms, X represents a hydroxyalkyl group having 1–10 carbon atoms, and n is an integer from 1–3, provided that two or more Rs, if present may be either different or identical and two or more Xs, if present, may be either different or identical.

2. The aqueous coating composition according to claim 1, wherein the monomer (a) is a compound selected from the group consisting of (meth)acrylic acid, fumaric acid, itaconic acid, monoalkyl itaconate, maleic acid, crotonic acid, and 2-methacryloyloxyethylhexahydrophthalic acid.

3. The aqueous coating composition according to claim 1, wherein the monomer (b) is a compound selected from the group consisting of methyl(meth)acrylate, ethyl(meth)acrylate, n-propyl(meth)acrylate, i-propyl(meth)acrylate, n-butyl(meth)acrylate, i-butyl(meth)acrylate, n-amyl(meth)acrylate, hexyl(meth)acrylate, i-amyl(meth)acrylate, hexyl(meth)acrylate, ethylexyl(meth)acrylate, hexyl(meth)acrylate, ethylhexyl(meth)acrylate, i-nonyl(meth)acrylate, decyl(meth)acrylate, hydroxymethyl(meth)acrylate, hydroxyhexyl(meth)acrylate, hydroxypropyl(meth)acrylate, hydroxybutyl(meth)acrylate, hydroxyamyl(meth)acrylate, hydroxyhexl(meth)acrylate, and cyclohexyl(meth)acrylate.

4. The aqueous coating composition according to claim 1, wherein the component (A) is prepared by the emulsion polymerization of the component (a), component (b), and component (c).

5. The aqueous coating composition according to claim 1, wherein the copolymer forming the aqueous dispersing material of the component (A) has a weight average molecular weight from 3,000 to 1,000,000.

6. The aqueous coating composition according to claim 1, wherein the component (B) is a compound selected from the group consisting of α-aminoalcohol, β-aminoalcohol, diethanolamine, triethanolamine, 2-amino iso-hexyl alcohol, N,N-diethylethanolamine, N,N-dimethylethanolamine, aminoethylethanolamine, N-methyl-N,N-diethanolamine, N,N-dibutylethanolamine, N-methylethanolamine, and 3-amino-1-propanol.

7. The aqueous coating composition according to claim 1, further comprising (C) an alkali metal compound in an amount of 0.05–40 parts by weight for 100 parts by weight (solid basis) of the component (A).

8. The aqueous coating composition according to claim 7, wherein the component (C) is a compound selected from the group consisting of sodium hydroxide, potassium hydroxide, sodium carbonate, potassium carbonate, sodium hydrogencarbonate, and potassium hydrogencarbonate.

9. The aqueous coating composition of claim 1, wherein the copolymer comprises 5–35 wt % of monomer (a).

10. The aqueous coating composition of claim 1, wherein the copolymer comprises 10–30 wt % of monomer (a).

11. The aqueous coating composition of claim 1, wherein the copolymer comprises 40–80 wt % of monomer (b).

12. The aqueous coating composition of claim 1, wherein the copolymer comprises 50–70 wt % of monomer (b).

13. The aqueous coating composition of claim 1, wherein the copolymer is polymerized in the presence of an emulsifying agent.

14. The aqueous coating composition of claim 1, wherein the copolymer is polymerized in the presence of chain transfer agents.

15. The aqueous coating composition of claim 1, wherein the copolymer has a particle size of 0.01 to 1 $\mu$m.

16. The aqueous coating composition of claim 1, wherein the copolymer has a particle size of 0.05 to 0.2 $\mu$m.

17. The aqueous coating composition of claim 7, wherein the alkali metal compound (C) is selected from the group consisting of sodium hydroxide, potassium hydroxide, sodium carbonate, potassium carbonate, sodium hydrogencarbonate, and potassium hydrogencarbonate.

18. The aqueous coating composition of claim 1, further comprising at least one additive selected from the group consisting of a wax emulsion, an alkali soluble resin, a film-forming adjuvant, a wetting agent, a dispersant, a leveling agent, an antiseptic agent, and an anti-foaming agent.

19. The aqueous coating composition of claim 1, wherein the glass transition temperature is from 10 to 80° C.

20. A substrate coated with the aqueous coating composition of claim 1.

* * * * *

UNITED STATES PATENT AND TRADEMARK OFFICE
CERTIFICATE OF CORRECTION

PATENT NO.    : 6,476,108 B1
DATED         : November 5, 2002
INVENTOR(S)   : Mogi et al.

It is certified that error appears in the above-identified patent and that said Letters Patent is hereby corrected as shown below:

Column 12,
Line 48, delete "hexyl(meth)acrylate"
Line 49, delete "hexyl(meth)"
Line 50, delete "acrylate, ethylhexyl(meth)acrylate"
Line 52, delete "hydroxyhexyl" and insert -- hydroxyethyl --

Signed and Sealed this

Fifteenth Day of April, 2003

JAMES E. ROGAN
*Director of the United States Patent and Trademark Office*